United States Patent Office 3,057,797
Patented Oct. 9, 1962

---

3,057,797
LOW COST EMUSION DRILLING FLUID
Duane B. Anderson and James L. Lummus, Tulsa, Okla., assignors to Pan American Petroleum Corporation, Tulsa, Okla., a corporation of Delaware
No Drawing. Filed Jan. 4, 1960, Ser. No. 69
15 Claims. (Cl. 252—8.5)

This invention relates to well drilling operations. More particularly, it relates to a drilling fluid of the water-in-oil emulsion type.

In U.S. Patent 2,661,334, issued to James L. Lummus on December 1, 1953, a water-in-oil emulsion drilling fluid is described and claimed. This drilling fluid has enjoyed considerable commercial success since it affords most of the advantages of an oil-base drilling fluid at a lower cost. A still lower cost water-in-oil emulsion drilling fluid is, of course, desirable. Other lower cost emulsion drilling fluids of the water-in-oil type have been proposed but most of them are subject to inversion by contamination with additional water or clay solids. Almost all such emulsions are sensitive to elevated temperatures.

An object of this invention is to provide an improved emulsion drilling fluid of the water-in-oil type. A more specific object is to provide a low cost water-in-oil emulsion drilling fluid which is not readily inverted by the addition of water or clay solids and which has improved stability at elevated temperatures. An additional object of the invention is to provide a method for drilling or working over wells in which the drilling cost can be reduced and the difficulties due to high temperatures can be avoided by use of a particular type of water-in-oil emulsion drilling fluid.

In general, we accomplish the objects of our invention by providing a water-in-oil emulsion drilling fluid in which lecithin is used as the principal emulsifier and the emulsion is stabilized by an oil-soluble nitrogen-containing surface active agent more exactly defined hereinafter. Salts and solids may also be added with advantage.

It is to be noted that the emulsion stabilizer is an oil soluble emulsifier itself and therefore aids the lecithin in forming a water-in-oil emulsion. This is in contrast to the action of the stabilizing agent in the compositions of U.S. Patent 2,661,334 Lummus where the stabilizer is water soluble and tends to form an oil-in-water emulsion. The tendency of the water soluble agent is, therefore, to counteract, in part, the water-in-oil emulsifying tendency of the lecithin. The water soluble agent is required in the composition of 2,661,334, however, to stabilize the emulsion against the effects of water and large volumes of drilled solids. We have now found that a narrow class of oil soluble nitrogen-containing surface active agents will provide stability to water and solids contamination. Tables III and VI show in more detail stability to water and solids respectively. At the same time the oil-soluble materials assist, rather than counteract, the tendency of the lecithin to form water-in-oil emulsions. This permits the use of much lower concentrations of the lecithin and thus decreases the cost and increases the stability of the drilling fluid.

Our preferred formula is shown in Table I.

Table I

| | |
|---|---|
| Water | parts by volume__ 60 |
| Diesel oil | do____ 40 |
| Commercial lecithin | lbs./bbl__ 2 |

Table I—Continued

| | |
|---|---|
| Alkaterge-T | lbs./bbl__ 0.5 |
| Gilsonite | lbs./bbl__ 2 |
| Ground oyster shells | lbs./bbl__ 5 |
| $BaCl_2$ | lbs./bbl__ 5 |
| $Al_2(SO_4)_3 \cdot 18H_2O$ | lbs./bbl__ 5 |

Commercial lecithin usually contains about equal quantities of lecithin and another phosphatide, cephalin, dissolved in a vegetable oil which is generally soybean oil. The phosphatides ordinarily make up about two-thirds and the soybean oil about one-third of commercial lecithin. This is the principal emulsifying agent. Alkaterge-T has the formula

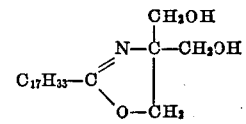

This is the emulsion stabilizing agent.

Considerable variations can be made in the preferred formula. Permissible variations in concentrations are indicated in the following table. If more concentrated forms of phosphatides are used, the concentration range of this ingredient may be correspondingly reduced.

Table II

| | |
|---|---|
| Water | 40 to 70 parts by volume. |
| Oil | 30 to 60 parts by volume. |
| Commercial lecithin | At least 1.5 lbs./bbl. |
| Stabilizer | At least 0.25 lb./bbl. |
| Petroleum residue | 0 to 20 lbs./bbl. |
| Inert solids | 0 to 600 lbs./bbl. |
| Salts | 0 to sufficient to saturate water. |

Considering the ingredients individually in more detail, the oil should be a mineral oil. Preferably, it should be a distilled petroleum fraction having low viscosity and high flash and fire points to avoid fire hazards. Diesel fuel and kerosene are suitable materials. Many light crude oils can be used if necessary. They should be avoided if possible, however, to avoid the natural emulsifiers, viscosity increasing agents, and fire hazards characteristic of most crude oils. In any case, a small pilot batch of drilling fluid should be prepared with any oil of questionable utility, and the properties of the drilling fluid measured before preparation of a large batch of drilling fluid to be used commercially.

The properties of drilling fluids using three different oil bases are presented in Table III, together with data showing the effects of changing the oil/water ratio. In all the tests the viscosity was measured by a Stormer viscosimeter rotating at about 600 r.p.m. as described in API Recommended Procedure 29. The viscosity, yield value and gel strength were measured by a variable speed Fann viscosimeter as described in the article, "Meter Aids Exact Mud Control," by J. C. Melrose and W. B. Lillenthal, on page 136 of the July 1, 1952, issue of World Oil. Fluid loss values were determined by the standard API method. The compositions of the drilling fluids were as shown in Table I except as noted in Table III. All drilling fluids were prepared by first dissolving the lecithin and Alkaterge-T in the oil, then blending in the gilsonite and ground oyster shells, adding the salts and then mixing in the water. Finally, the emulsion was stirred for 30 minutes on a Hamilton-Beach mixer.

Table III

| Test | Type oil | Oil/water ratio | Drilling fluid properties |||||| 
|---|---|---|---|---|---|---|---|---|
| | | | Visc., cpse. || Yield value | Gel strength || Fluid loss cc./30 min. |
| | | | Stormer | Fann | | 10 sec. | 10 min. | |
| 1 | Fuel | 140/210 | 44 | 44 | 8 | 3 | 3 | 1.3 |
| 2 | do | 210/140 | 11 | 12 | 3 | 2 | 2 | 3.3 |
| 3 | do | 105/245 | 104 | 80 | 31 | 6 | 6 | 1.8 |
| 4 | P–70 | 140/210 | 280 | ¹216 | ¹66 | 28 | 28 | 0.5 |
| 5 | Crude | 140/210 | 285 | ¹157 | ¹104 | 52 | 52 | 1.0 |

¹ Results obtained partly by graphing rather than by direct measurements only.

In Table III, as well as in the other tables, yield values and gel strengths are in units of pounds per 100 square feet. In Tests 1 to 3 of Table III, diesel fuel number 2 is used. This oil had a gravity of about 35° API and a viscosity of about 34 Saybolt Universal seconds at 100°. The P–70 oil used in Test 4 was a distilled petroleum fraction having a viscosity of about 70 Saybolt Universal seconds at 100° F. In Test 5, the crude was a 33.8° API gravity crude oil from the Greyburg formation of the North Cowden Field in Texas.

In Test 1, the composition is exactly that given in Table I. This test is repeated in most of the remaining tables for purposes of comparison. The oil/water ratio in Test 2 was changed to 60/40 rather than the preferred 40/60. The resulting composition was a stable emulsion but the viscosity was quite low. The gel strength was barely able to support the ground oyster shells and gilsonite. It is apparent that 60 parts per volume of oil is near the upper limit unless a more viscous oil, such as those used in Tests 4 and 5, is substituted for the relatively low viscosity fuel oil. The use of high oil/water ratios is sometimes advisable when contaminations by large volumes of water and drilled solids is anticipated. In Test 3, the oil/water ratio was decreased to 30/70. The result was increased viscosity, gel strength, and fluid loss. The properties did, however, remain within desirable limits. This high concentration of water should not ordinarily be exceeded in preparing the emulsion drilling fluid because of the high viscosities and gel strengths which result, particularly when high concentrations of solids are present, and to allow for the water which usually enters a drilling fluid as a contaminant.

Tests 4 and 5 show the results of using oils of higher viscosity. It will be apparent that if such oils are used, higher oil/water ratios should be employed to produce lower drilling fluid viscosities and gel strengths. Conversely, it will be apparent that if higher drilling fluid viscosities and gel strengths are required, as when higher oil/water ratios are used, the use of a more viscous oil will provide the desired increases.

Table IV presents data on the effects of changing the concentration of lecithin. The lecithin, in every case is commercial lecithin containing about one-third lecithin, one-third cephalin, and one-third soybean oil. The mixing procedure was that described in connection with Table III.

Table IV

| Test | Lecithin conc., lb./bbl. | Drilling fluid properties |||||| 
|---|---|---|---|---|---|---|---|
| | | Visc., cpse. || Yield value | Gel strength || Fluid loss cc./30 min. |
| | | Stormer | Fann | | 10 sec. | 10 min. | |
| 1 | 2 | 44 | 44 | 8 | 3 | 3 | 1.3 |
| 2 | 1.5 | 36 | 38 | 6 | 3 | 3 | 1.6 |
| 3¹ | 3 | 44 | 42 | 10 | 4 | 5 | 1.3 |

¹ Only 0.25 lb./bbl. Alkaterge-T in this drilling fluid.

The composition in Test 1 was that shown in Table I containing 2 pounds per barrel of commercial lecithin. In Test 2, the composition was as shown in Table I except the lecithin concentration was decreased to 1.5 pounds per barrel. The drilling fluid properties were obviously quite satisfactory indicating that even lower concentrations can sometimes be used. It should be recalled, however, that in the tests reported, all ingredients other than lecithin were at nearly optimum concentrations. This will not ordinarily be true in practice. Therefore, the concentration of lecithin should not usually be much less than 1.5 pounds per barrel for practical use. Test 3 shows the effects of cutting the concentration of the stabilizing surface active agent and increasing the concentration of lecithin. Again, it will be noted that the drilling fluid properties are quite satisfactory showing that considerable variation is permissible in lecithin concentration even when the concentration of the stabilizing agent is low. In special cases, up to about 10 pounds per barrel of commercial lecithin per barrel of drilling fluid may be used. Such high concentrations normally are not employed, however, principally for economic reasons.

That the concentration of the stabilizing agent can also be varied is shown in Table V. This table also shows the results of changing the nature of the stabilizing agent. Again, all the drilling fluids were prepared by the method described in connection with Table III. Again, also all the compositions are the same as shown in Table I except as noted in Table V.

Table V

| Test | Stabilizer || Drilling fluid properties |||||| 
|---|---|---|---|---|---|---|---|---|
| | Nature | Conc., lb./bbl. | Visc., cpse. || Yield value | Gel strength || Fluid loss cc./30 min. |
| | | | Stormer | Fann | | 10 sec. | 10 min. | |
| 1 | Alkaterge-T | 0.5 | 44 | 44 | 8 | 3 | 3 | 1.3 |
| 2 | do | 0.25 | 32 | 31 | 6 | 3 | 3 | 1.8 |
| 3¹ | do | 0.25 | 44 | 42 | 10 | 4 | 5 | 1.3 |
| 4 | Alkaterge-C | 0.5 | 33 | 29 | 9 | 2 | 2 | 3.2 |
| 5 | Alkaterge-E | 0.5 | 28 | 24 | 7 | 2 | 3 | 3.4 |
| 6 | H.B.A. of Armeen HT² | 0.5 | 32 | 27 | 9 | 2 | 2 | 3.2 |
| 7 | H.B.A. of Armeen S² | 0.5 | 36 | 32 | 9 | 2 | 2 | 2.4 |

¹ 3 lb./bbl. lecithin in this drilling fluid.
² H.B.A. means hydroxybutyramide. Armeen HT is the mixture of amines produced from hydrogenated tallow acids. Armeen S is the mixture of amines produced from soybean acids and therefore having the hydrocarbon radicals naturally occurring in soybean oil.

Tests 1 and 3 in Table V are the same as Tests 1 and 3 in Table IV, and are repeated for purpose of comparison of results of other tests. In Test 2 of Table V, the concentration of lecithin was left at 2 pounds per barrel as in Test 1, while the concentration of Alkaterge-T was cut to 0.25 pound per barrel as in Test 3. The results of both Tests 2 and 3 show that good drilling fluid properties can be produced even with low concentrations of the stabilizer. It should be noted, however, that one function of the Alkaterge-T is to stabilize the emulsion against the effects of water and solids contamination. For this reason, the concentration of the stabilizer should not be less than about 0.2 pound per barrel and preferably not less than about 0.5 pound per barrel. The use of higher concentrations provides not only a stronger water-in-oil emulsion, but also greater stability to the effects of water and solids contamination. Use of more than 2 or 3 pounds per barrel ordinarily is not advisable for economic reasons since lower concentrations usually provide adequate stability. In addition, higher concentrations sometimes have a tendency to flocculate solids, such as barite, and cause them to drop out of the emulsion.

Oil-soluble stabilizing agents in the class found to be effective contain a nitrogen atom which is attached to two radicals. One is an aliphatic hydrocarbon radical containing at least about 12 carbon atoms. The other radical contains 4 or 5 carbon atoms and at least 1 and preferably 2 or 3 oxygen atoms. The long hydrocarbon chain is required to provide oil solubility. The nitrogen and oxygen atoms in the short radical impart a strong water solubility to this end of the molecule. The result is an oil soluble material which tends to form water-in-oil emulsions. At the same time, the highly water soluble end produces approximately the same stabilizing effects against water and solids contamination as provided by the water soluble stabilizing agents in the compositions of 2,661,334 Lummus. Tests 4 to 7 show the results of using several different agents falling within this general class. It will be apparent that all are satisfactory alternates for Alkaterge-T, although the latter material seems to be superior in some respects and is, therefore, preferred.

Stabilizing agents falling within the class which has been found to be suitable may be divided into two subclasses. One is the Alkaterges. The other is the hydroxybutyramides. The formula of Alkaterge-T has already been given. Formulas for Alkaterge-C and Alkaterge-E are presented below together with the two possible forms of hydroxybutyramides.

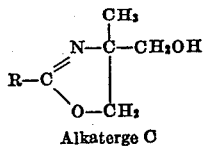

Alkaterge C

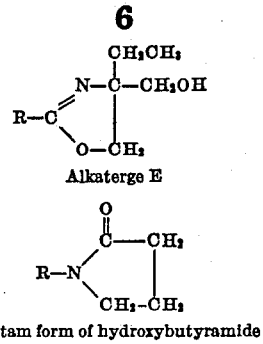

Alkaterge E

Lactam form of hydroxybutyramide $$R-NH\overset{O}{\overset{\|}{C}}-CH_2-CH_2-CH_2OH$$

Hydroxybutyramide

The Alkaterges have the general formula

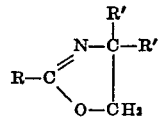

In the Alkaterges the R group is ordinarily $C_{17}H_{33}$—. In both the Alkaterges and the hydroxybutyramides, however, the R group may be varied widely. It should contain at least 12 carbon atoms and preferably at least about 16 in order to insure good oil solubility. It should not ordinarily exceed about 22 carbon atoms for the same reason. In some cases, the R group can be somewhat longer than 22 carbon atoms but it should not contain less than 12.

In the hydroxybutyramides the R group is attached directly to the nitrogen atom. In the Alkaterges it is attached through a carbon atom in the ring. When the nitrogen is said to be attached to the R group it will be understood that a direct attachment or an attachment through a ring carbon is intended. In the general Alkaterge formula R' is —$CH_3$, —$CH_2CH_3$, or —$CH_2OH$, at least one R' being —$CH_2OH$. When reference is made to a stabilizing agent or the hydroxybutyramide of an amine, this should be interpreted to mean either a single compound or a mixture of compounds falling within the general definition.

The effects of various solids, salts and mixing procedures on the properties of the drilling fluid are shown in Table VI. The order in which the ingredients were mixed was the same as described in connection with Table III except where barite or Xact Clay were added. These materials were added after the regular drilling fluid components had been mixed together and thoroughly stirred. The compositions of the drilling fluids were as shown in Table I except for the changes in solids and salts as noted in Table VI.

*Table VI*

| Test | Solids, lb./bbl. | | | | Salts, lb./bbl. | | | | | Visc., cpse. | | Yield value | Gel strength | | Fluid loss cc./30 min. |
|---|---|---|---|---|---|---|---|---|---|---|---|---|---|---|---|
| | Gilsonite | OB Wate | Barite | Xact Clay | Al₂SO₄ | BaCl₂ | CaCl₂ | (NH₄)₂SO₄ | MgCl₂ | Stormer | Fann | | 10 sec. | 10 min. | |
| 1 | 2 | 5 | | | 5 | 5 | | | | 44 | 44 | 8 | 3 | 3 | 1.3 |
| 2[1] | 2 | 5 | | | 5 | 5 | | | | 69 | 52 | 24 | 7 | 19 | 0.7 |
| 3[1] | | | | | 5 | 5 | | | | 33 | 30 | 8 | 2 | 2 | 156 |
| 4[1] | 2 | | | | 5 | 5 | | | | 127 | 72 | 51 | 35 | 107 | 6.5 |
| 5 | 2 | | | | 5 | 5 | | | | 38 | 41 | 5 | 2 | 2 | 22.0 |
| 6 | | 5 | | | 5 | 5 | | | | 49 | 42 | 12 | 6 | 6 | 2.2 |
| 7 | 10 | 5 | | | | | | | | 63 | 54 | 12 | 2 | 3 | 5.0 |
| 8 | 10 | 5 | 250 | | | | | | | 114 | 92 | 22 | 4 | 5 | 0.5 |
| 9[2] | 10 | | | 50 | | | | | | | 150 | 100 | 39 | 62 | 0.5 |
| 10[2] | 10 | | | 50 | | | 10 | | | 170 | 62 | 101 | 18 | 29 | 0.9 |
| 11[2] | 10 | | | | | | 10 | | | 82 | 59 | 18 | 5 | 10 | 6.1 |
| 12 | 10 | | | 50 | | | 10 | | | 240 | 63 | 101 | 20 | 29 | 1.3 |
| 13 | 10 | | | | | | 10 | | | 67 | 53 | 15 | 4 | 9 | 6.2 |
| 14 | 2 | 5 | | 50 | 5 | 5 | | | | 170 | 64 | 80 | 13 | 18 | 2.4 |
| 15 | 10 | | | | | | | 10 | | 85 | 60 | 20 | 8 | 20 | 3.0 |
| 16 | 10 | | | | | | | | 10 | 47 | 44 | 4 | 1 | 2 | 7.7 |

[1] Mixed with Waring Blendor rather than a Hamilton-Beach Mixer.
[2] The stabilizer was the hydroxybutyramides of mixed amines derived from soybean acids rather than Alkaterge-T.

the table, OB Wate is ground oyster shells. Xact y is a finely ground hydratable clay sold for use in paring aqueous muds. The aluminum sulfate used was hydrate having the actual formula $Al_2SO_4.18H_2O$. Considering first the tests involving the various solids, t 3 shows the results of using no solids other than aluminum sulfate and barium chloride. While both s are soluble in water, they react to form a finely di- :d precipitate of barium sulfate. The properties of drilling fluid was satisfactory except for the high 1 loss. The precipitated barium sulfate crystals were sufficiently large to give a low fluid loss. This fluid is so high that at least some solids should always added to the drilling fluid and this is usually the case. s possible, however, to use the drilling fluid without ed solids since in drilling operations solid particles be dispersed into the drilling fluid in a short time. est 5 in Table VI shows the results of omitting the und oyster shells but including the gilsonite, and Test lows the results of omitting the gilsonite but includ- the ground oyster shells. Obviously, both materials effective alone for decreasing fluid loss. Ground ter shells are much more effective at low temperatures 1 gilsonite. The gilsonite is included principally be- se it decreases fluid loss at high temperatures. There- :, there is little point in including gilsonite if the com- tion is to be used only at low temperatures.

he composition of Test 7 contains no salts but includes pounds of gilsonite per barrel of drilling fluid. The ilts are included principally for comparison to the ilts of Test 8 in which 250 pounds of barite were ed per barrel of drilling fluid. It will be apparent the drilling fluid properties are quite satisfactory oth cases. The barite did not settle out of the drill- fluid. As might be expected, the large amount of 1 particles decreased the fluid loss.

ests 9 to 14, inclusive, in Table VI show the effects hydratable clay on the drilling fluid. The clay was ' finely ground so the effects were much more severe i if the same quantity of hydratable shales and clays red the drilling fluid as bit cuttings during drilling rations. Test 9 shows the effects of adding 50 pounds he clay to a salt-free drilling fluid. The Stormer vis- ty was too high to measure conveniently, but the Fann ling shows the viscosity was not greatly excessive. :r setting for 24 hours, a very stiff gel formed. In : of these severe effects, the emulsion did not tend nvert but remained a stable water-in-oil emulsion. refore, it will be apparent that the drilling fluid be used without salts, as long as the amount of dis- ed solids does not become extremely great. It is erred, of course, that a salt be present to bring the osity down into a lower range as shown in Tests nd 12. Tests 11 and 13 are included for comparison ests 10 and 12, respectively, to show the effects of ng hydratable clay solids when salts are present. s 10 and 11 are also of value in showing that sta- ing agents of the hydroxybutyramide subclass are ap- imately equally as effective as the Alkaterge sub- i in acting as stabilizing agents. The preference for Alkaterge subclass in this reagrd is based principally s lower cost.

ne advantage of the presence of clay solids is the gel strengths. These prevent settling of barite from ing fluids, a problem with many emulsion muds. high initial gel may prevent optimum settling of ngs in mud pits but cuttings can be removed by shale ers and even more effectively by recently developed ocyclones. It should be noted that the high gel igths are not accompanied by high viscosities in these icular emulsion drilling fluids. Therefore, the drill- fluids can be easily pumped in spite of the rather gel strengths.

hen the term "inert solids" is used herein, a solid as ground oyster shells, barite or the like is intended which is not soluble in the oil or water or does not disperse to a substantial degree in oil or water to form particles in the colloidal range. The term may include some clays which hydrate to only a limited degree. The term also includes the portion of water soluble salts in excess of the amount required to saturate the water.

Ordinarily, the inert solids should be finely divided so they are easily supported in the emulsion and form an effective filter cake on the well walls to decrease fluid loss. The term "finely divided," in this regard, means the particles pass a number 325 sieve in the U.S. Standard screen scale. Larger particles of inert solids may, of course, also be present but these have little effects on mud properties such as fluid loss, viscosity, and gel strength.

Gilsonite is representative of a class of solid, high-melting petroleum residues which soften in the range from about 250° F. to about 350° F. These include high-melting petroleum resins which remain after precipitation of asphalt from asphaltic residuals with pentane. The preferred type of residues, however, are the natural solid asphaltic minerals such as gilsonite, elaterite, manjak, glance pitch and grahamite. Still other will be apparent to those skilled in the art.

Other solids or ingredients may be present in the drilling fluid. When the term "consisting essentially of" is used herein, it is intended to indicate a composition containing the named materials plus any others such as drilled solids which do not substantially affect the properties of the composition.

A comparison of Tests 1, 7, 11, 13, 15, and 16 in Table VI shows the effects of various salts. Test 7 demonstrates that a satisfactory salt-free drilling fluid can be prepared. Test 16 indicates that magnesium chloride is satisfactory but has no particular advantage. Tests 11 and 13 show that higher gel strengths can be obtained by use of calcium chloride. The ammonium sulfate used in Test 15 also produced higher gel strengths and a somewhat lower fluid loss than calcium chloride. For really effective fluid loss control, the combination of aluminum sulfate and barium chloride should be used. As noted above, the results are probably due to the formation of a precipitate of barium sulfate which forms a very effective seal over the mat of larger particles.

The concentration of dissolved salt in the water can vary from zero to an amount sufficient to saturate the water. A larger amount of salts can, of course, be present. That amount in excess of the quantity soluble in the water, however, simply acts as an inert solid and should be so considered.

Some of the effects of mixing methods are also shown in Table VI. The ingredients and order of mixing of the compositions of Tests 1 and 2 were identical. The only difference was that in Test 1, the mixing was performed by a Hamilton-Beach mixer, while in Test 2 a Waring Blendor was employed. The Hamilton-Beach mixer has been found by experience to produce about the same degree of mixing in the laboratory as is provided by the use of mud guns or propeller mixers in the mud pits, and circulating the drilling fluid in a well. A Waring Blendor provides a much more vigorous stirring action which is more comparable to pumping the fluid through orifices or homogenizers. Obviously, the more vigorous stirring operation produced higher viscosities and gel strengths. The same results are shown in Tests 4 and 5 which differ in the same way as Tests 2 and 1. In the case of Test 4, the viscosities and gel strengths are even higher than in Test 2 due to the absence of ground oyster shells. In the past, higher viscosites and gel strengths have been avoided, if possible, in emulsion muds. In some cases, however, these are desirable as noted above. In such cases, it is apparent that the higher viscosities and gel strengths can be obtained by more vigorous stirring.

The thermal stability of the drilling fluid was checked by placing samples of compositions in an oven in sealed, brass cylinders 2½ inches in diameter and 3¼ inches deep. The temperature of the oven was 350° F. The samples were left in the oven for 18 hours. Results of the tests are reported in Table VII. The fluid loss and viscosity values given in Table VII for drilling fluids after heating were measured after the drilling fluids had been cooled to about 80° F. and mixed in a Hamilton-Beach mixer for about 10 or 20 minutes. The changes indicated thus represent permanent changes in the properties of the emulsion rather than temporary thermal effects. The samples in all cases contained 2 pounds of commercial lecithin and 0.5 pound of the stabilizing agent per barrel of drilling fluid. In Tests 1 to 4, inclusive, the oil/water ratio was 40/60. In Tests 5 and 6, it was 50/50. The method of mixing was that described in connection with Table III except that in Tests 5 and 6 the barite was added last after the other ingredients had been thoroughly mixed.

Table VII

| Test | Salt | Solids, lb./bbl. | | Properties before and after heating | | | |
|---|---|---|---|---|---|---|---|
| | | | | Stormer viscosity, cpse. | | Fluid loss cc./30 min. | |
| | | Gilsonite | Barite | Before | After | Before | After |
| 1 | CaCl₂ | 10 | | 72 | 90 | 2.5 | 12.4 |
| 2¹ | CaCl₂ | 10 | | 97 | 116 | 2.5 | 13.0 |
| 3 | (NH₄)₂SO₄ | 10 | | 85 | 215 | 3.0 | 3.8 |
| 4¹ | (NH₄)₂SO₄ | 10 | | 56 | 88 | 2.9 | 6.7 |
| 5 | (NH₄)₂SO₄ | 10 | 150 | 51 | 94 | 0.2 | 0.9 |
| 6¹ | (NH₄)₂SO₄ | 10 | 150 | 45 | 87 | 0.2 | 1.7 |

¹ Used hydroxybutyramide of amines from soybean acids rather than the Alkaterge-T used in Tests 1, 3, and 5.

All compositions tested remained stable emulsions even after the severe heating test. Both the viscosity and the fluid loss values were increased but remained within acceptable limits. Results of Tests 5 and 6, when compared to those of Tests 1 to 4, show that fluid loss can be controlled by the use of additional solids, and lower viscosities can be obtained by increasing the oil/water ratio. Properties can also be improved by the addition of a little lecithin after the drilling fluid has been subjected to high temperatures.

The order of mixing the drilling fluid ingredients has some effects on the properties of the drilling fluid. In general, however, these effects are small. Therefore, the ingredients can be mixed in any desired order. It is preferred to dissolve the lecithin and stabilizing agent in the oil first then add the gilsonite, ground limestone and salts, and finally mix in the water. This composition can then be weighted with barite or the like.

Frequently, the order of mixing will be controlled by the form in which the ingredients are handled. For example, it may be desired to mix the lecithin, stabilizing agent, salts and gilsonite with sufficient ground oyster shells, clays, or other finely divided solids, to form a dry, free-flowing, powdery concentrate. This concentrate can then be dispersed into the oil after which the water is mixed in to complete the drilling fluid.

A liquid concentrate can be formed which includes the lecithin, stabilizing agent, and enough oil to form a liquid or paste. If the paste or liquid is sufficiently viscous, the ground oyster shells and salts may also be suspended in it. Usually, the gilsonite should not be added to liquid concentrates since the golsonite tends to produce excessive thickening.

Typical concentrates are shown in Table VIII. In the table the parts by weight are given in terms such that use of a weight in pounds equal to the total parts by weight shown will produce about one barrel of drilling fluid.

Table VIII

| Ingredient | Parts by weight in various types of concentrate | | |
|---|---|---|---|
| | Solid | Paste | Liquid |
| Lecithin | 2.0 | 2.0 | 2.0 |
| Alkaterge-T | 0.5 | 0.5 | 0.5 |
| Al₂SO₄.18H₂O | 5.0 | 5.0 | 5.0 |
| BaCl₂ | 5.0 | 5.0 | 5.0 |
| OB Wate | 7.5 | 5.0 | 5.0 |
| Oil | | 2.5 | 12.5 |
| Total | 20.0 | 20.0 | 30.0 |

If the salts are omitted from the solid concentrate, a little more ground oyster shells (OB Wate) may be desirable to form a more dry, powdery concentrate. Even when the salts are present, more finely divided inert solids may be added to give a concentrate of the desired degree of dryness. Gilsonite may be included in the solid concentrate if desired. It is ordinarily preferable, however, to omit the gilsonite and add this ingredient separately, as needed for decreasing fluid loss at high temperatures.

Salts may also be omitted from the liquid or paste concentrates together with the inert solids. This is advisable in the more dilute forms of liquid concentrates to avoid settling of these solids from the oil.

In general, the essential ingredients of both solid and liquid concentrates, the term liquid concentrates including the pastes, are from about 1.5 to about 10 parts by weight of commercial lecithin and from about 0.2 to about 3 parts by weight of the stabilizing agent. In the dry concentrate, sufficient inert solids are then added to form a dry powder. In the liquid concentrates, sufficient oil is added to give the desired viscosity.

The same general precautions should be observed in use of this emulsion drilling fluid as are observed in the use of most oil base or water-in-oil emulsion drilling fluids. For example, excessive contamination with water and solids should be avoided wherever possible even though our emulsion drilling fluid has been shown to have good stability to moderate amounts of these contaminants. Metal mud pits should be used wherever possible rather than open earthen pits. Precautions should be taken to prevent unusual loss of the fluid to formations being drilled. The fluid, while considerably less expensive than most oil base or emulsion muds, is still somewhat more expensive than aqueous muds. Other special precautions commonly observed with oil base and water-in-oil emulsion drilling fluids will be apparent to those skilled in the art.

While our composition is intended primarily as a drilling fluid, it can also be used for fracturing formations, for completing or working over wells, as a solids-free system for gun or jet perforating operations or the like. In general, it can be used for any of the many purposes for which oil base or water-in-oil emulsion drilling fluids have been used in the past.

We claim:
1. A stable water-in-oil emulsion drilling fluid comprising from about 40 to about 70 parts by volume of water and from about 30 to about 60 parts by volume of oil, said emulsion drilling fluid containing at least about 1.5 pounds per barrel of commercial lecithin, at least about 0.25 pound per barrel of an emulsion stabilizing agent selected from the group of oil-soluble surface active agents consisting of those having the formulas:

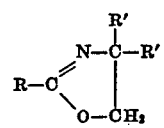

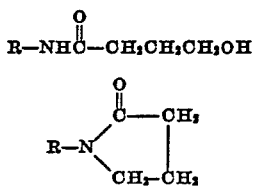

in which R is an aliphatic hydrocarbon radical containing at least 12 carbon atoms and R' is selected from the group consisting of —CH₃, —CH₂CH₃, and —CH₂OH, at least one R' group being —CH₂OH, from 0 to about 20 pounds per barrel of a solid petroleum residue melting between about 250° F. and about 350° F., from 0 to about 600 pounds per barrel of finely divided inert solids, and from 0 pounds per barrel of a water-soluble salt to an amount of said salt sufficient to saturate the water.

2. The drilling fluid composition of claim 1 in which said stabilizing agent has the formula:

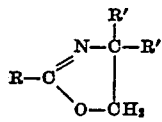

where R is an aliphatic hydrocarbon radical containing at least 12 carbon atoms and R' is selected from the group consisting of —CH₃, —CH₂CH₃ and —CH₂OH, at least one R' group being —CH₂OH.

3. The drilling fluid composition of claim 1 in which said stabilizing agent is the hydroxybutyramide of an amine having an aliphatic hydrocarbon radical containing at least 12 carbon atoms.

4. The drilling fluid composition of claim 2 in which said stabilizing agent has the formula:

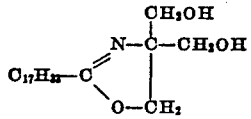

5. The drilling fluid composition of claim 3 in which said stabilizing agent is the hydroxybutyramides of mixed amines having the hydrocarbon radicals naturally occurring in soybean oil.

6. A drilling fluid concentrate suitable for forming stable water-in-oil emulsion drilling fluids comprising from about 1.5 to about 10 parts by weight of commercial lecithin, from about 0.2 to about 3 parts by weight of an emulsion stabilizing agent selected from the group of oil-soluble surface active agents consisting of those having the formulas:

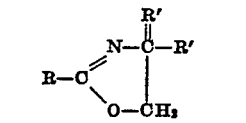

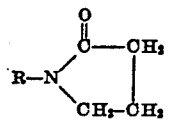

in which R is an aliphatic hydrocarbon radical containing at least 12 carbon atoms and R' is selected from the group consisting of —CH₃, —CH₂CH₃, and —CH₂OH, at least one R' group being —CH₂OH, and sufficient of a finely divided inert solid to form a dry free-flowing powdery mixture.

7. The drilling fluid concentrate of claim 6 in which said stabilizing agent has the formula:

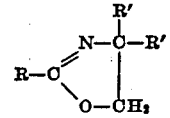

where R is an aliphatic hydrocarbon radical containing at least 12 carbon atoms and R' is selected from the group consisting of —CH₃, —CH₂CH₃ and —CH₂OH, at least one R' group being —CH₂OH.

8. The drilling fluid concentrate of claim 6 in which said stabilizing agent is the hydroxybutyramide of an amine having an aliphatic hydrocarbon radical containing at least 12 carbon atoms.

9. A drilling fluid concentrate suitable for forming stable water-in-oil emulsion drilling fluids comprising from about 1.5 to about 10 parts by weight of commercial lecithin, from about 0.2 to about 3 parts by weight of an emulsion stabilizing agent selected from the group of oil-soluble surface active agents consisting of those having the formulas:

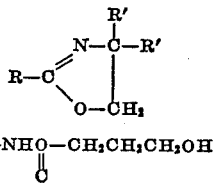

and

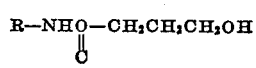

in which R is an aliphatic hydrocarbon radical containing at least 12 carbon atoms and R' is selected from the group consisting of —CH₃, —CH₂CH₃, and —CH₂OH, at least one R' group being —CH₂OH, and sufficient oil to provide a liquid concentrate having the desired viscosity and gel strength.

10. The drilling fluid concentrate of claim 9 in which said stabilizing agent has the formula:

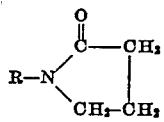

where R is an aliphatic hydrocarbon radical containing at least 12 carbon atoms and R' is selected from the group consisting of —CH₃, —CH₂CH₃ and —CH₂OH, at least one R' group being —CH₂OH.

11. The drilling fluid concentrate of claim 9 in which said stabilizing agent is the hydroxybutyramide of an amine having an aliphatic hydrocarbon radical containing at least 12 carbon atoms.

12. A process of drilling a well comprising circulating down the well, through the bit, and past the exposed formations a drilling fluid having the composition defined in claim 1.

13. A process of drilling a well comprising circulating down the well, through the bit, and past the exposed formations a drilling fluid having the composition of claim 2.

14. A process of drilling a well comprising circulating down the well, through the bit, and past the exposed formations a drilling fluid having the composition of claim 3.

15. A stable water-in-oil emulsion drilling fluid comprising from about 40 to about 70 parts by volume of water and from about 30 to about 60 parts by volume of oil, said emulsion drilling fluid containing at least about 1 pound per barrel of a phosphatide, at least about 0.25 pound per barrel of an emulsion stabilizing agent selected from the group of oil-soluble surface active agents consisting of those having the formulas:

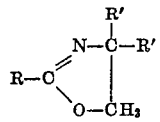

and

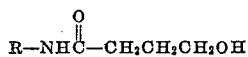

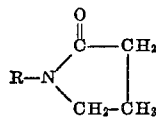

in which R is an aliphatic hydrocarbon radical containing at least 12 carbon atoms and R' is selected from the group consisting of —CH$_3$, —CH$_2$CH$_3$, and —CH$_2$OH at least one R' group being —CH$_2$OH, from 0 to abo 20 pounds per barrel of a solid petroleum residue melti between about 200° F. and about 350 F., from 0 to abo 600 pounds per barrel of finely divided inert solids, a from 0 pounds per barrel of a water-soluble salt to amount of said salt sufficient to saturate water.

References Cited in the file of this patent
UNITED STATES PATENTS

| | | |
|---|---|---|
| 2,316,968 | Miller | Apr. 20, 19 |
| 2,773,670 | Miller | Dec. 11, 19 |
| 2,885,358 | Reddie | May 5, 19 |
| 2,891,082 | Steinhauer et al. | June 16, 19 |
| 2,999,063 | Hoeppel | Sept. 5, 19 |

FOREIGN PATENTS

| | | |
|---|---|---|
| 1,037,388 | Germany | Aug. 28, 19 |

OTHER REFERENCES

Zimmerman et al.: Handbook of Material Tra Names, Supplement I, Ind. Res. Service Inc. of Dov N.H., 1956, p. 10.

UNITED STATES PATENT OFFICE
CERTIFICATE OF CORRECTION

Patent No. 3,057,797            October 9, 1962

Duane B. Anderson et al.

It is hereby certified that error appears in the above numbered patent requiring correction and that the said Letters Patent should read as corrected below.

In the heading to the printed specification, line 2, in the title, for "EMUSION" read -- EMULSION --; column 3, line 46, for "field" read -- fluid --; column 7, line 61, for "reagrd" read -- regard --; column 8, line 23, for "other" read -- others --; column 9, line 72, for "golsonite" read -- gilsonite --; column 10, line 63, for "compris-" read -- comprising --; column 11, lines 55 to 60, the formula should appear as shown below instead of as in the patent:

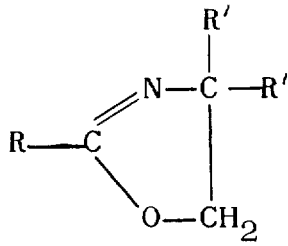

column 12, lines 29 and 30, the formula should appear as shown below instead of as in the patent:

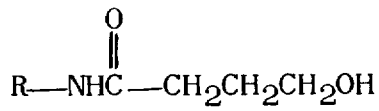

line 53, for "seected" read -- selected --; column 14, line 3, for "betwen" read -- between --; same line 3, for "350 F." read -- 350° F. --.

Signed and sealed this 2nd day of April 1963.

(SEAL)
Attest:

ESTON G. JOHNSON            DAVID L. LADD
Attesting Officer            Commissioner of Patents